Jan. 29, 1924.
H. C. EGERTON
1,482,185
MOLDING PROCESS
Filed April 14, 1919
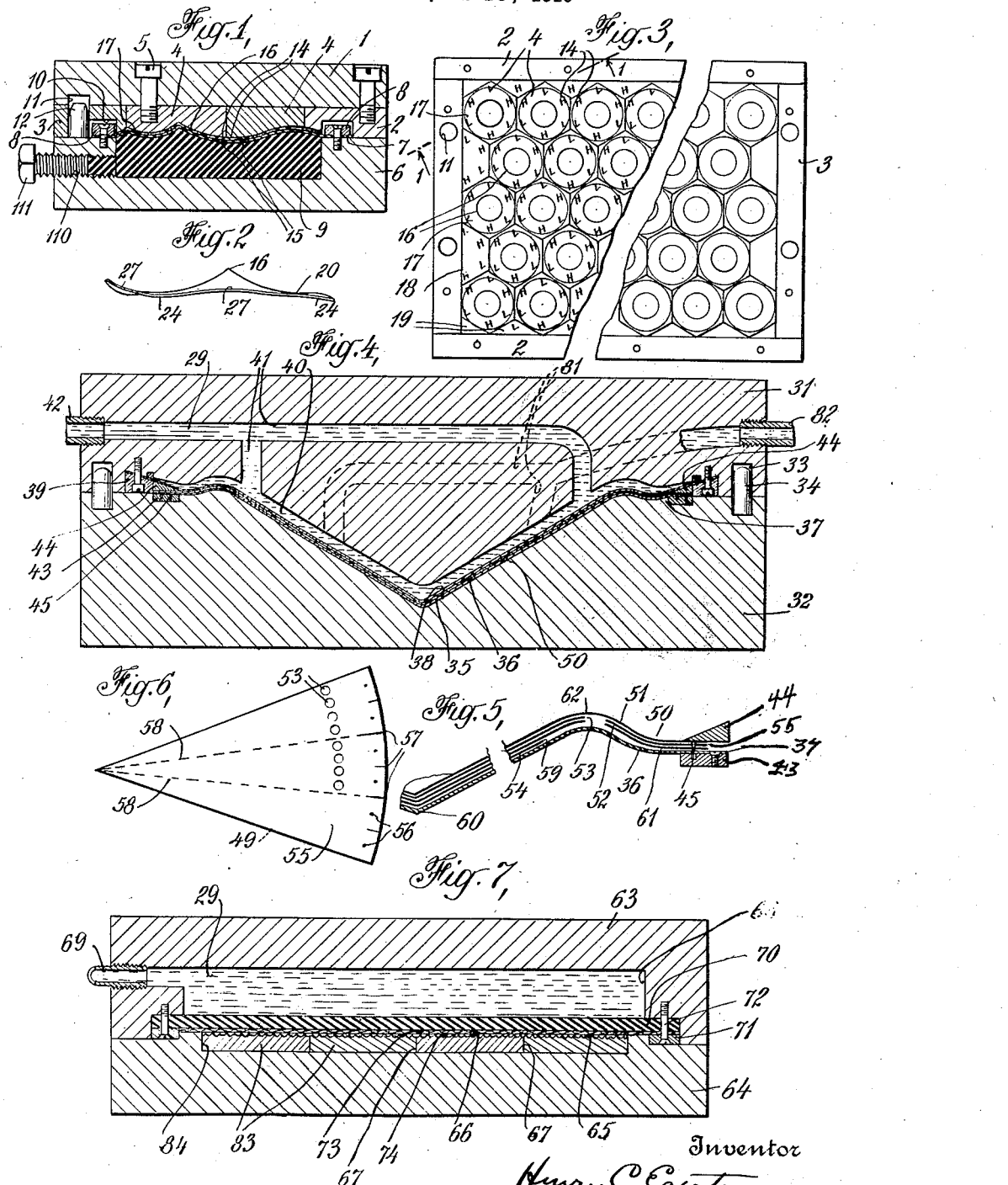
Inventor
Henry C Egerton
By his Attorney
Harry L Duncan Patented Jan. 29, 1924.

1,482,185

UNITED STATES PATENT OFFICE.

HENRY C. EGERTON, OF RIDGEWOOD, NEW JERSEY.

MOLDING PROCESS.

Application filed April 14, 1919. Serial No. 289,960

*To all whom it may concern:*

Be it known that I, HENRY C. EGERTON, a citizen of the United States, and resident of Ridgewood, county of Bergen, State of New Jersey, have made a certain new and useful Invention Relating to Molding Processes, of which the following is a specification, taken in connection with the accompanying drawing.

This invention relates especially to processes of molding fibrous material, such as cloth, cotton batting, paper, etc., carrying and preferably quite thoroughly impregnated with suitable plastic material, such as phenolic condensation cementing material of the general character of phenolic condensation varnish compositions such as are referred to in the Egerton Patent 1,352,740 at line 25 of page 1 thereof. Thin, elastic or other articles of various kinds may be produced in this way by cementing together and simultaneously shaping several sheets of thin cotton fabric impregnated with such cementing material as dried phenolic condensation varnish, and for many purposes quite uniform elastic, thin, warped surface articles such as pressure diaphragms, etc., can be produced in this way. One of the mold elements of rigid character may advantageously be formed in many cases of separately formed or surfaced units or portions which may be assembled in various ways as by securing them to a mold backing member. The thin impregnated fabric or other sheeted fibrous material may be placed on a rigid mold member of this character and forced against the same at high pressure to effect the heat curing of the cementing material, by various means preferably involving a yieldable or equalizing molding member to force the article of fibrous material against the rigid mold. For this purpose the opposing mold member is preferably of a yielding or elastic character in whole or in part and may comprise a more or less flowable or equalizing mold backing so that substantially uniform pressure is secured in various parts of the article and uniformity promoted in the finished cured article which thus tends to have a more uniform content of this stiffening cementing material which naturally greatly enhances the strength and stiffness of the cotton or other fibrous material with which it is incorporated. It is also highly desirable to have one or more of the operating faces of the mold elements formed of inert metallic material which is not undesirably acted on by the particular cementing composition used and for such phenolic condensation compositions nickel or Monel metal is desirable. The rigid mold may be formed of such inert material or faced therewith and the yielding or equalizing mold member opposed thereto may in many cases be advantageously faced with a more or less yieldable facing of such inert metal or material and may be more or less composed of a thin yieldable sheet thereof through which the yieldable or flowable backing exerts the desired molding pressure.

In the accompanying drawing showing in a somewhat diagrammatic way various illustrative forms of apparatus for carrying out this process, Fig 1 is a partial transverse section through part of such a molding apparatus taken substantially along the line 1—1 of Fig. 3;

Fig. 2 shows one form of article which may be produced in this way;

Fig. 3 is a bottom view of the rigid or upper molding member;

Fig. 4 is a transverse view showing another molding apparatus;

Fig. 5 is a partial transverse sectional view showing the way in which the article blank may be assembled;

Fig. 6 shows one of the fabric or fibrous blanks for such an article; and

Fig. 7 is a transverse view through another molding apparatus.

Where a great many relatively small thin or other articles are to be molded of such cured impregnated fibrous material it is advantageous to simultaneously mold a number of such articles. For this purpose the molding apparatus may comprise a sectional molding member of rigid character which may be built up of a number of mold units or elements that have been separately forged or otherwise formed and surfaced to properly mold one side of the article. As shown in Fig. 3, substantially circular articles especially where they are of relatively thin sheet material may be molded in a sectional mold of this character having the mold units 4 of substantially hexagonal form so that they fit together within edge members, such as 2, 3, all of which may be screwed or otherwise securely united to a backing plate 1 as by the screws 5 shown in Fig. 1. Of course filling members, such as 18, 19, may be used to fill up the edge spaces beyond the hexagonal units, if desired, so that a substantially continuous sheet may be molded in this way to simultaneously form any desired number of articles within the limits of the hydraulic press or other molding devices employed. Where such thin articles which may sometimes be less than a hundredth of an inch thick are formed of one or more layers of fabric carrying considerable proportions of such phenolic condensation cementing material, it is desirable where the central portions of the article are of a protruding character such as the conical projection 16 shown in Figs. 1-3, that the edges of the article 20 may be given a fluted or wavy form to compensate for the extra amount of material forced into this projecting center so that puckering or other surface irregularity is minimized. A more or less uniform wavy character may be given to such an article edge which may have such high spots as 24 and interposed low spots 27 and where six such high and low spots occur in the fluted edge of an article, it is possible to arrange the mold elements in such way that the low spots, for example, occur at contiguous corners of the three adjacent mold elements, three high spots occurring at the next corner of each of the molds which makes possible a uniform wavy deformation of the fabric throughout the entire molded surface. This is indicated in Fig. 3 in which the letters L designating low spots are shown interposed between the high spots H around the edges of each of these mold units. Where the finished articles are to be of substantially circular form the extensions of the hexagonal mold elements beyond the circular outline of the finished article may be given such a contour as makes them most satisfactorily and gently merge into the surfaces of the adjacent mold elements and an edge contour can be secured which gives uniformly meeting or matching surfaces throughout the entire sectional or composite rigid mold and minimizes breakage or cracking of the fabric or other fibrous material during the pressure molding operation. It is of course desirable to have the previously impregnated and dried layer or layers of muslin or fabric, uniformly sheeted cotton batting, etc. carrying forty to sixty per cent more or less of dried phenolic condensation varnish or other suitable phenolic condensation cementing material warmed and softened before or after it is applied to one of the cooperating molding members and before the high molding pressure is exerted thereon so that its edges may contract or draw in sufficiently to accommodate the somewhat irregular or warped surface which it assumes in conformity to the molding member. For this purpose the fibrous material may, for example, be applied to a heated molding member and as soon as it becomes warmed and softened it may be gently forced against the molding member by a yieldable brush or other pressure device before the cooperating molding member is forced home which greatly minimizes injurious strains on the fabric when it is subjected to the heat molding and curing operation under pressures of a number of hundred pounds per square inch.

It is also highly desirable in securing a substantially uniform thickness, strength and other properties in the thin molded material especially where a sectional or built up rigid molding member of this character is used to have the cooperating molding element of an equalizing or yieldable character so that the pressure exerted becomes substantially uniform throughout the different parts of the molding surface regardless of slight irregularities in thickness of the article or the height of the rigid mold element as is practically inevitable where a built up molding element is formed in this way. For this purpose a more or less elastic or flowable molding element or backing is desirable. As indicated in Fig. 1 a mold may have a frame or support 6 of cast iron, steel or other metal within which may be arranged a more or less flowable or yieldable elastic mold backing 9 of vlucanized or uncured rubber, gutta percha, or lead or similar flowable metal where very high molding pressures are used or still more flowable materials, such as heavy oils, tars, or fluid material where a metallic or other impervious mold facing is employed. As indicated in Fig. 1 a mold facing 7 which may be of thin sheet metal may be used above such a yieldable or more or less flowable mold backing 9 which may be compressed or forced out behind the mold facing to the desired extent in any suitable way as by forming a compression aperture or portion 110 in the mold in which the threaded compression member or screw 111 may operate as indicated. This screw may force the mold facing 7 out to the extent desired. This mold facing may be secured at its edges to the mold support 6 as by a clamping member or portion 8 screwed in position on top of the mold facing which may advantageously be formed of such metal or material as is substantially inert to the phenolic condensation cementing and stiffening material employed so as to retain the desired mold surface configuration, or polish. For this reason also the rigid mold member may advantageously be formed of or faced with similar inert material, such, for example, as nickel, Monel metal or other noncorrodible or noble metal or alloy compositions which are sufficiently inert to the phenolic condensation cementing material employed while possessing the desired physical properties in other directions. Good results can be secured by using relatively soft or elastic vulcanized rubber as the yieldable backing 9 behind such a thin sheet metal facing 7 which may be conveniently formed of nickel or Monel metal a hundredth of an inch thick more or less and this gives a one-piece yieldable molding member which may be used a number of times without renewal or any great amount of readjustment and may be given sufficient equalizing action for many such articles. After assembling in the mold the fibrous material for the articles which may be in one or more layers of sheeted impregnated fibrous material or fabric, the molds may be forced together by hydraulic or other high pressure, so that the heated molds may exert a pressure of a number of hundred pounds per square inch throughout the surfaces of the articles for a sufficient time to effect the curing of the phenolic condensation cementing material to the extent desired. For thin articles not more than one or two hundredths of an inch thick, for example, a curing heat of 300° to 320° Fahrenheit for fifteen to thirty minutes or so is usually ample for such phenolic condensation varnish coatings and such articles can be sufficiently cured in this way to separate readily from the inert molding elements which may readily impart a high polish and smooth or other desired surface thereto. The molds may, for example, be formed with cooperating holes 11 and locating pins 12 and if desired, such recesses as 10 may be formed to accommodate the clamping members 8. For some purposes it is advantageous to form the rigid mold member with marking or indicating projections, such as the edge nicking members 15 which may extend more or less around each of the mold units so as to mark or partly sever the articles along the desired lines of severance. In this way the articles may be marked at the edges or other portions at the same time that they are molded and subsequent manufacturing or assembling operations greatly facilitated.

In many cases it is desirable to give thin sheet articles of such impregnated fibrous material locally weakened portions so as to increase their flexibility at such points and a yieldable or equalizing molding member of this general character is of advantage in this connection. It is sometimes desirable also to preliminarily shape the article blank on a removable molding member or other support so as to secure a unitary or shaped article blank before the heat curing and high pressure molding of the article is effected. As indicated in Fig. 4, the mold may comprise the members 31, 32 having, if desired, suitable locating holes and pins 33, 34 at various points and one of these members may have one or more shaped molding cavities 35 of any desired contour and size corresponding generally to the shape of the article desired. In some cases it is quite desirable to have a series of removable inert metallic facings for use in connection with each molding cavity especially where a special multiple thickness or multiple piece fibrous or fabric blank is used for making the article and such a removable mold facing as 36 may be formed of nickel, Monel metal or other suitable sheet metal of any convenient thickness and may be spun or forced against the mold cavity 35 to secure its proper conformation preferably in connection with suitable annealing steps as its shaping progresses. A removable mold facing of this character may advantageously be provided with an attached edge member or ring, such as 43, of steel or other metal to which the edge 37 of the mold facing may be secured in any desired way as by the screws indicated. Of course, an inert or special metallic mold facing may be permanently secured to a mold element in this or other ways, and if desired, the edges of the mold facing or other portions thereof may be screwed, riveted, soldered or otherwise secured to the mold.

Although it is not necessary for many classes of articles, it is desirable where thin resilient articles, such as pressure or other diaphragms are being made to have an equalizing molding member to more or less uniformly compress and consolidate the impregnated fibrous material during the curing thereof, so that the completed article will have the desired strength, elasticity and stiffness throughout its different parts. For this reason a somewhat yieldable or elastic sheet molding member is desirable in at least one of the cooperating mold elements and as indicated in Fig. 4 a metallic sheet molding member 38 may be used preferably of nickel or other inert material on its outer surface and having sufficiently thin yielding character at least throughout parts of its surface to conform to the irregularities of surface or thickness in the article being molded. The edges of such a sheet metal equalizing molding member as 38 may be secured to one of the mold members 31 as by a securing ring or clamping member 39 screwed or otherwise secured to the molding member so that a space 40 is formed behind this yieldable molding member or facing for the fluid or other more or less yieldable or flowable mold backing which may be used in any particular case. As shown in Fig. 4, a series of supply passages 41 may be formed in the mold member connected as by the pressure pipe 42 with a hydraulic or other pressure device so that a pressure medium or mold backing 29 which may be of heavy oil or other suitable fluid or more solid material, such as previously described, may be forced into the mold after the cooperating mold elements have been closed around a blank or may be permanently supplied to the yieldable molding element to a sufficient extent so that the closing of the molds exerts this desired molding pressure. It is quite desirable to have such a yieldable molding element where some parts of the article are made thinner because comprising a fewer number of layers of the fabric or other fibrous material which may be advantageously effected in some cases by forming graduated holes in the article blank or elements thereof which can be so arranged as to reduce the number of layers of material in a circumferential ring or other part of the article to the desired extent.

In forming such an article as 50 in a mold of this character the article may as indicated in Fig. 5 comprise a greater number of layers adjacent its central portion 60 where an extra more or less conical layer 54 of fabric or other material, which may sometimes be impregnated, may be used, its edge 59 approaching the curved or rounded weakened edge portion 62 of the article which is thus given a more yielding flexible character because of its shape as well as its reduced thickness. An article having tapered layers of a more or less conical or protruding form may be in many case advantageously assembled and more or less roughly formed within a movable mold facing or support, such as 36. For this purpose the mold facing and its supporting reenforcing ring 43 may be mounted within a heated supporting member so as to have a temperature of 200° Fahrenheit or more so that the impregnated or coated fabric or fibrous material carrying such phenolic condensation cementing material becomes sufficiently heated to soften and yield so that it may be gently pressed into the desired conical or other form and by carrying the heat high enough this cementing material may sufficiently soften to become adherent in the different layers of material so that they may be preliminarily secured together and a formed up blank produced in which the different parts may be properly arranged before being subjected to the heavy molding and curing pressure. This is also highly advantageous because such a preliminary smoothing and shaping operation makes it possible to press the layers of fabric or other material closely into contact so that air bubbles or separation of the layers of the finished article is thereby minimized. In the case of such a more or less conical article as shown in Figs. 4 and 5, it is advantageous to form it of a number of sector shaped pieces of impregnated or coated cloth, paper or other fabric which may be stamped up of the desired shape and simultaneously formed with one or more rows of weakening or thinning round or other holes or apertures and such edge separtion, locating holes and other features as desired. One form of such a sector shaped blank is shown in Fig. 6 as comprising a row of thinning holes or apertures 53 which may extend throughout this entire blank around one or more circumferential portions thereof or throughout only part of the same, so that one or more complete or imperforate layers of fabric may be provided throughout this weakened part of the article as desired. In this particular instance the blank 55 is designed to be overlapped by two other similar blanks whose imperforate edges such as 49 may be arranged in positions corresponding to the dot and dash lines 58. Thus the body of such article blank formed in this way will have three layers of impregnated fabric while the weakened portion where the weakening holes 53 occur will have one layer of imperforate fabric and two perforated layers, if desired. The blank may of course be formed with locating holes 56 around its edge portion and with edge nicks or severances 57 which are sometimes desirable in promoting yielding at about this point. It is of coures understood that such fabric or fibrous blanks of this character may have such angular extent as seem desirable for the particular article intended and they may have such angular extent that a single sector shaped blank extends completely around the article to form an entire layer which minimizes the number of radial seams or overlapping portions; or by using a greater number of sector shaped blanks a greater number of such radial seams occur in the finished article, while there is usually correspondingly less wastage in stamping or forming the blanks. The blank may be formed in such a removable mold facing as 36 as by first placing therein adjacent the center 60 of the facing the one or more center stiffening layers 54 which are used and then arranging the other sector shaped blanks in position preferably by the use of suitable locating pins, such as 45, which may be arranged in the supporting ring or member 43 or in a covering 44 which may be more or less tightly clamped in position thereon after the blanks have been assembled. Then this removable facing and blanks may be heated in any desired way as by placing the facing in contact with a heated supporting member of substantially the same contour. This sufficiently softens the blanks at all points where they engage the facing so that they gradually soften and bend down into contact therewith, and they may also be smoothed or forced together and quite securely united in proper position so that a preliminarily shaped and united blank may advantageously be thus formed at the desired heat which should be of such relatively low temperature or continue for such a short time as not to undesirably cure the material in this preliminarily arranged condition into which it is forced at moderate pressure.

The shaped article and the removable mold facing or support therefor may then be inserted in the curing mold and its parts or layers forced together strongly by high hydraulic or other pressure of a number of hundreds pounds or so per square inch during the heat curing molding of the article which solidifies the phenolic condensation cementing material and permanently unites the fibrous material which is of course greatly stiffened and strengthened by the phenolic condensation or other material carried thereby. By the use of an equalizing or more or less yieldable molding member the different parts of the article may be forced together at substantially the same pressure throughout the different circumferential portions of similar character so that desirable uniformity in the strengthened elasticity of such corresponding portions is secured which is quite desirable for example in thin pressure or other diaphragms where lightness and quick and responsive movement is desired. When the upper mold section is more highly heated or when the greater amount of heat is supplied therefrom the upper layers of the article are more rapidly heated and cured in this final heat curing molding operation which is desirable where the preliminary shaping heat treatment involved a heating from below. Another desirable feature of heating principally from the top of the article is that the complete curing thus occurs first at the upper surface or portion which is thus more quickly freed from strong adhesion to the contacting metal or other surface so that when the heat curing has progressed sufficiently this upper surface is readily released and when the upper mold 31 is raised by the hydraulic press, for example, preferably after some withdrawing or releasing the upper equalizing metallic molding member where hydraulic fluid is used behind it, the article tends to remain in engagement with the removable mold facing 36 below so that it may be removed from the lower mold together with this facing and another removable mold facing and article blank inserted in the press. It is often desirable to cool the molded composite fabric article before the high molding pressure is released and for this purpose it is sometimes desirable to force relatively cool high pressure liquid or fluid against the thin metallic equalizing molding member so as to quickly cool it and the thin article beneath without cooling the entire metallic molds before the heavy molding pressure is released. For this purpose still higher pressure cool liquid may be forced into the connection 82 so as to enter the chamber 40 through the passages 81 and effect this cooling operation while the relatively heated liquid 29 is simultaneously forced out through the connections 41, 42. This high pressure liquid is of course released or the pressure thereon lowered before the molds are separated to prevent injury to the thin sheet metal molding element.

Fig. 7 shows still another form of apparatus in which the cooperating mold elements 63, 64 may comprise a series of shaped or contoured mold cavities, such as 65, 66, which may in some cases have a repeating contour or shape along the mold surface at such junction points as 67, and if desired, these contoured molding surfaces may be formed on replaceable molding elements 83 clamped or otherwise supported in the mold cavity 84. Such mold surface may be conveniently formed by forging or hydraulic pressing processes in which a steel die, for example, may be strongly forced against a mold element of any suitable metal and having its upper molding surface at least formed of nickel or other suitable inert material. The other mold element 63 may be formed with a cavity 68 closed by the yielding or equalizing molding element 70 which may in some cases be formed of vulcanized rubber in whole or in part and have its edges bolted in place as by screws or bolts 72 extending through the clamping ring or edge member 71. A more or less fluent or yieldable mold backing 29 may be used in this cavity and either forced into the same through the pipe or conduit 69 or held therein by suitable means, so that when the molds are forced together this vulcanized rubber or other backing is strongly forced against the back 73 of the article during the heat curing thereof. One type of articles which may be formed in this way is designating badges, strips or devices which may sometimes have distinctively colored numbers or other indications on the surface thereof. For this purpose distinctively or contrastingly colored molding phenolic condensation composition may be forced to the desired extent into the recesses of the contoured mold face 65 and then as is sometimes desirable a fabric backing 73 which may be impregnated with such phenolic condensation cementing material may be put in place in the mold before the cooperating mold element is forced home and the desired high molding pressure exerted during the heat curing of the article. It is of course desirable where a rubber faced yieldable mold member is used to use some inert facing material thereon to prevent undesirable sticking and French chalk or other material may be applied to the mold in liquid or other form to secure adherence so that when it dries on the heated mold surface a stiffened layer of this inert parting material is present to ensure separation of the molded article. Such molding apparatus and process may be effectively used for forcing into a properly contoured mold a plurality of layers of substantially uniform plastic molding phenolic condensation or other compositions so that the lower layer engaging the contoured molding surface is forced completely into the same and allows the contrasting colored layers above to more or less enter the numerals or other designating depressions in the mold surface during the heat curing molding process. Such cured phenolic condensation or other compositions may then be subjected to a grinding and buffing finishing process which grinds off the facing layer of material throughout the area corresponding to the designating numerals or other indications so that the contrasting backing material is thus revealed throughout this surface for indicating purposes. For such numeral or other indicators it is of course desirable to have the contoured molding surface of a separable or interchangeable character as described and replaceable molding elements representing the different numerals or other indications may of course be inserted in a suitable cavity in one of the mold members and secured therein in any desired way for such work.

This invention has been described in connection with a number of illustrative embodiments, articles, forms, proportions, materials, devices, temperatures, conditions and times and orders of treatment to which of course the inventions is not of course to be limited, since what is claimed as new and what is desired to be secured by Letters Patent is set forth in the appended claims.

1. The process of molding thin warped surface articles comprising a number of layers of fabric carrying impregnating cured phenolic condensation cementing material, which comprises assembling on a removable metallic mold facing a plurality of article blanks, heating the mold facing and article blanks and forcing the blanks together into substantial contact to form a contoured shaped partly cured article blank substantially corresponding to the finished article, transferring the removable mold facing and article blank to the pressure curing mold having a shaped molding cavity corresponding to the removable mold facing and forcing an equalizing molding member against the article blanks to complete the final shaping of the article and heating them to effect their heat curing while they are strongly compreessed to consolidate the layers of fibrous material.

2. The process of molding thin warped surface articles comprising fabric carrying cured phenolic condensation cementing material, which comprises assembling on a removable metallic mold facing a plurality of article blanks, heating the mold facing and article blanks and forcing the blanks together to form a shaped partly cured article blank substantially corresponding to the finished article, transferring the removable mold facing and article blank to the pressure curing mold and forcing a molding member against the article blank to complete the final shaping of the article and heating them to effect their heat curing while they are strongly compressed to consolidate the layers of fibrous material.

3. The process of molding warped surface articles comprising a number of layers of fibrous material carrying cured phenolic condensation cementing material which comprises assembling on a removable metallic support a plurality of article blanks, heating the article blanks and forcing the blanks together into substantial contact to form a contoured shaped partly cured article blank, transferring the support and article blanks to the pressure curing device and compressing the article blanks and simultaneously heating them to effect their heat curing.

4. The process of molding articles comprising fibrous material carrying cured phenolic condensation cementing material which comprises assembling on a removable metallic support a plurality of article blanks, heating the article blanks and forcing the blanks together to form a shaped partly cured article blank, transferring the support and article blanks to the pressure curing device and compressing the article blanks and simultaneously heating them to effect their heat curing.

5. The process of molding warped surface articles comprising fabric and incorporated cured phenolic condensation cementing material which comprises forming a series of sector shaped article blanks each having a circumferential row of weakening perforations and assembling said article blanks so that an imperforate portion of one of said blanks overlaps the perforations in a blank in overlapping engagement therewith, heating said assembled blanks and preliminarily shaping them and heat curing said shaped blanks under high pressure and cooling the shaped blanks before completely relieving the curing pressure thereon.

6. The process of molding articles comprising fabric and incorporated cured phenolic condensation cementing material which comprises forming a series of sector shaped article blanks each having weakening perforations and assembling said article blanks so that an imperforate portion of one of said blanks overlaps the perforations in a blank in overlapping engagement therewith, heating said assembled blanks and preliminarily shaping them and heat curing said shaped blanks under high pressure.

7. The process of molding warped surface articles comprising fabric and incorporated cured phenolic condensation cementing material which comprises forming a series of sector shaped article blanks and assembling said article blanks, heating said assembled blanks and preliminarily shaping them in connection with a molding support and heat curing said shaped blanks under high pressure while on said support.

8. The process of molding warped surface articles comprising fabric and incorporated cured phenolic condensation cementing material which comprises forming a series of article blanks and assembling said article blanks, heating said assembled blanks and preliminarily shaping them to form contoured shaped blanks and subsequently molding and heat curing said shaped blanks under high pressure.

HENRY C. EGERTON